United States Patent [19]
Chung et al.

[11] Patent Number: 5,990,041
[45] Date of Patent: Nov. 23, 1999

[54] MESOPOROUS ACTIVATED CARBON FILAMENTS

[75] Inventors: Deborah D. L. Chung, Amherst; Weiming Lu, Buffalo, both of N.Y.

[73] Assignee: Research Foundation of State University of New York at Buffalo, Amherst, N.Y.

[21] Appl. No.: 08/835,151

[22] Filed: Apr. 4, 1997

Related U.S. Application Data

[60] Provisional application No. 60/015,141, Apr. 5, 1996.

[51] Int. Cl.$^6$ .............................. B01J 20/02; D01F 9/12
[52] U.S. Cl. ..................... 502/416; 502/424; 502/427; 502/420; 502/430; 502/432; 502/433; 502/434; 502/436; 423/447.6; 423/447.7
[58] Field of Search ................. 502/416, 424, 502/427, 420, 430, 432, 433, 434, 436; 423/447.6, 447.7

[56] References Cited

U.S. PATENT DOCUMENTS

| | | | |
|---|---|---|---|
| 3,959,448 | 5/1976 | Fuller et al. | 423/447.7 |
| 4,045,368 | 8/1977 | Katori et al. | 502/416 |
| 4,439,349 | 3/1984 | Everett et al. | 502/180 |
| 4,921,831 | 5/1990 | Nakai et al. | 502/416 |
| 4,975,263 | 12/1990 | Furuyama et al. | 423/447.7 |
| 5,030,435 | 7/1991 | Kitamura et al. | 423/447.6 |
| 5,212,144 | 5/1993 | Schwartz, Jr. | 502/424 |
| 5,238,470 | 8/1993 | Tolles et al. | 95/143 |
| 5,242,879 | 9/1993 | Abe et al. | 502/180 |
| 5,304,527 | 4/1994 | Dimitri | 502/425 |
| 5,446,005 | 8/1995 | Endo | 502/433 |
| 5,451,554 | 9/1995 | Guile et al. | 502/418 |
| 5,472,742 | 12/1995 | Lee | 427/399 |
| 5,538,932 | 7/1996 | Yan et al. | 502/424 |
| 5,595,720 | 1/1997 | Arai et al. | 423/447.6 |

OTHER PUBLICATIONS

M.M. Dubinin, N.S. Polyakov and G.A. Petukhova, (1993), Porous Structure and Surface Chemistry of Active Carbons, Adsoprtion Science & Technology, vol. 10, pp. 17–26 month N/A.

H–L Chiang and P.C. Chiang, (1995), The Influence of 01113 Reaction om Physico–Chemical Characteristics of Activated Carbon for Benzene Adsorpton, Toxicol. and Environ. Chemistry, vol. 47, pp. 97–108 month N/A.

Y. Takeuchi abd T. Itoh, 1993, Removal from Ozone from Air by Activated Carbon Treatment, Separations Technology, vol. 3, pp. 168–175 Jul. 1993.

J. Alcaniz–Monge, D. Cazorla–Amoros, and A. Linares–Solano, (Mar. 1994), Effect of the Activating Gas on Tensile Strength and Pore Structure of Pitch–Based Carbon Fibres, Carbon, vol. 32, pp. 1277–1283.

A. Oya and S. Yoshida, (1996), Preparation and Properties of an Antibacterial Activated Carbon Fiber Containing Mesopores, Carbon, vol. 34, pp. 53–57 Jul. 1995.

A.W.P. Fung, Z.H. Wang, K. Lu, M.S. Dresselhaus and R.W. Pekala, (1993), Characterization of carbon aerogels by transport measurements; J. Mater. Res., vol. 8, pp. 1875–1885 Aug. 1993.

R. Ghosal. D.J. Kaul, U. Boes, D. Sanders, D.M. Smith and A. Maskara (1995), Speciality Carbon Adsorbents with a Tailored Pore Structure and their Properties, Mat. Res. Soc. Symp. Proc., vol. 371, pp. 413–423 month N/A.

Carbon Fiber Composites, p. 14, D.D.L. Chung, Butterworth–Heinemann, Newton, MA. (month not available), 1994.

*Primary Examiner*—Mark L. Bell
*Assistant Examiner*—Patricia L. Hailey
*Attorney, Agent, or Firm*—Hodgson, Russ, Andrews, Woods & Goodyear LLP

[57] ABSTRACT

This invention relates to a mesoporous carbon material in the form of filaments having a high surface area. A process is also provided to produce mesoporous carbon material of high surface area. The process comprises drying a carbon material, surface oxidizing the dried material, stabilizing the surface oxidized material, and activating the stabilized material to produce a highly activated, mesoporous material.

30 Claims, 4 Drawing Sheets

MESOPOROUS ACTIVATED CARBON FILAMENTS

This application claims the priority of a Provisional Application, Ser. No. 60/015,141 entitled "Mesopores Activated Carbon" filed on Apr. 5, 1996.

BACKGROUND OF THE INVENTION

1. Field of the Invention

This invention relates to the area of activated carbons. More particularly, this invention provides a mesoporous carbon material in the form of filaments having a high surface area. This invention also provides a process for the preparation of activatd mesoporous carbon material.

2. Description of Related Art

In recent years, research on porous carbon materials has been very active. The forms of porous materials include the conventional activated carbon bulk [Dubinin et al., 1993, *Adsorption Science Tech.*, vol 10:17–26; Chiang et al., 1995, *Toxicological Environmental Chem.*, vol 47:97–108; Takeuchi and Itoh, 1993, *Sep. Technol.*, vol 3:168–175], activated carbon fibers [Alcaniz-Monge et al., 1994, *Carbon*, vol 32:1277–1283; Oya et al., 1996, *Carbon*, vol 34:53–57], fine carbon particles [Ghosal et al., 1995, *Materials Research Society Symp. Proc.*, vol 371:413–423], and carbon aerogels [Fung et al., 1993, *Materials Res.*, vol 8:1875–1885], which are a solid network of carbon atoms strung along various directions thereby enclosing pores. Activated carbon materials are used not only as adsorbents for purification and chemical processing, but also as catalytic materials, battery electrode materials and biomedical engineering materials. Activated carbon materials are obtained by increasing the porosity of carbon.

According to the International Union of Pure and Applied Chemistry, pores are classified into four types, namely macropores (diameter>500 Å), mesopores (20 Å<diameter <500 Å), micropores (8 Å<diameter<20 Å) and micro-micropores (diameter<8 Å). In conventional activated carbons, most pores are micropores. The pores in activated carbon fibers (including pitch-based, polyacrylonitrile-based and rayon-based carbon fibers) are mainly micropores with some micro-micropores. Carbon aerogels mainly contain mesopores with some micropores. Thus although carbon aerogels contain mesopores, the specific surface area of carbon aerogels is generally about 650 $m^2$ g which is relatively low compared to activated carbons having specific surface areas as high as about 3000 $m^2/g$.

One of the requirements of porous activated carbons in biomedical engineering and other applications is that the activated material have mesopores and/or macropores. Many macromolecules and ions encountered in catalysis and batteries cannot penetrate the surface of carbons devoid of large percentages of such pores. A problem often encountered is how to fabricate a porous carbon material with a high specific surface area and good mechanical and physical properties.

U.S. Pat. No. 5,238,470 to Tolles et al. and U.S. Pat. No. 5,304,527 to Dimitri describe a method for producing highly activated and highly densified mesoporous carbon particles from lignocellulosic carbonaceous material. The patents also describe a method in which a carbonaceous material is treated with an activating agent to produce a plasticated carbonaceous material which is then densified to produce the activated carbon.

U.S. Pat. No. 5,242,879 to Abe et al. describes active carbon materials having an average pore radius of about 15 Å to 30 Å, prepared from waste material.

U.S. Pat. No. 4,439,349 to Everett et al. describes mesoporous carbon wherein the interparticle distances are of mesoporous size.

U.S. Pat. No. 5,472,742 to Lee describes activated carbon fibers produced by exposure to graphite oxide former followed by exposure to $CO_2$ former.

While activated carbon particles are useful in many applications, the filamentous form of activated carbon according to the present invention is preferred in some applications. Filamentous activated carbon like cotton wool clings together to form a mat without the need for a binder. The mat structure facilitates handling, sandwiching, rolling and cutting. Thus filamentous activated carbon according to the present invention is much more processeable than activated particles which require a binder and cannot be easily made into a thin flexible sheet. Further, a mat or compact of the present filamentous activated carbon resembling cotton wool has macropores between adjacent filaments. The macropores enhance the hydrodynamics of the mat as they provide channels for the flow of fluids thereby enhancing process kinetics.

SUMMARY OF THE INVENTION

Carbon filaments grown catalytically from carbonaceous gases and having diameters about 0.1 $\mu$m (in contrast to a typical diameter of 10 $\mu$m for conventional carbon fibers) are useful in numerous applications including vibration damping, electromagnetic interference (EMI) shielding and battery electrodes. The present invention is directed to a novel activation of such filaments. The resulting activated material has a specific area about 200 $m^2/g$ to about 1300 $m^2/g$ and a main pore size of about 50 Å.

Therefore, it is an object of the present invention to provide mesoporous carbon filaments that have a high specific surface area.

It is another object of the invention to provide a method for the production of mesoporous carbon material.

These and other aspects of the present invention will become more apparent to those skilled in the art by reference to the following description and its appended claims.

DETAILED DESCRIPTION OF THE INVENTION

Figure 1:
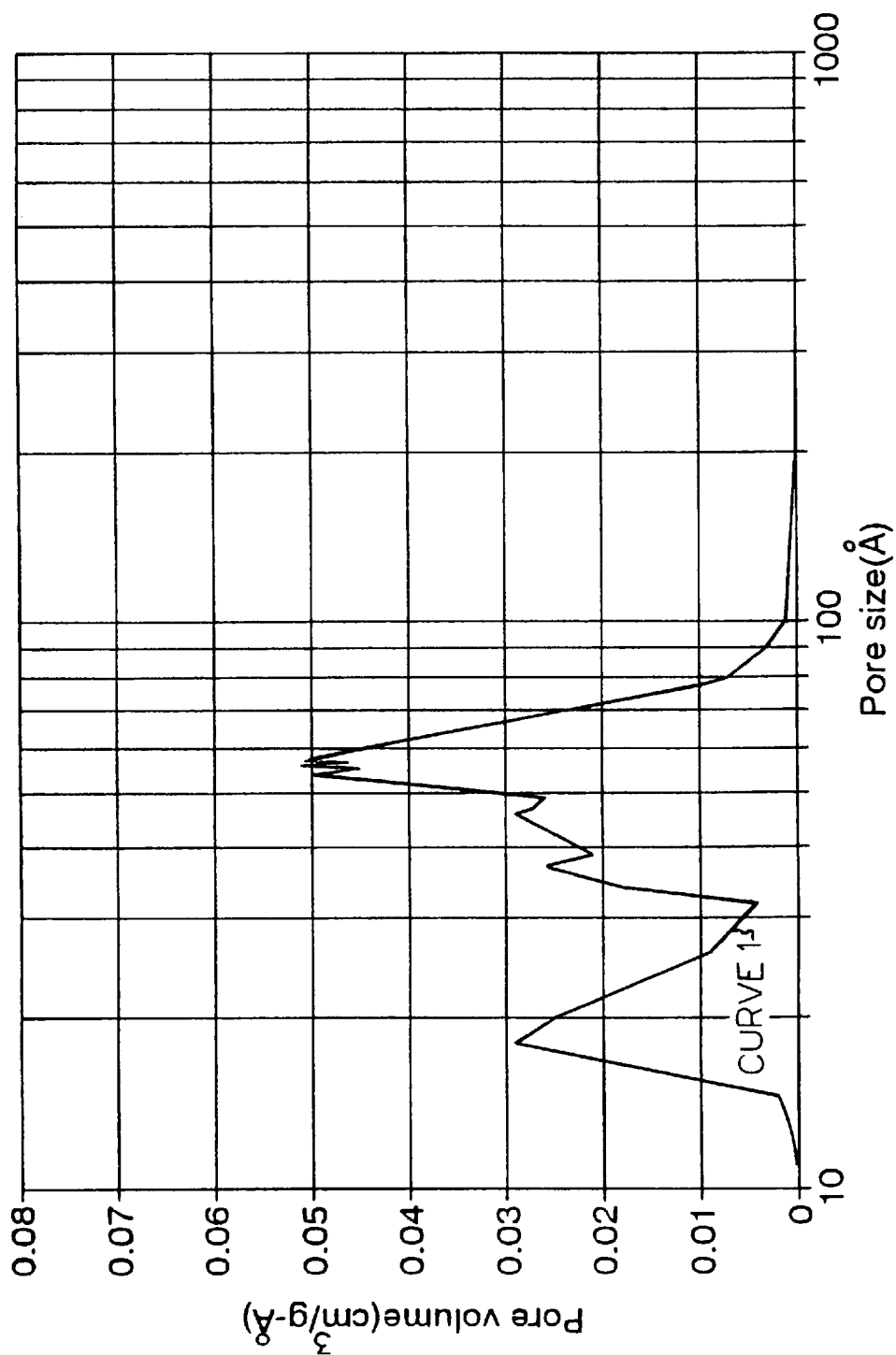
FIG. 1 is a plot of pore volume ($cm^3$/g-Å) as a function of the pore size indicating the distribution of activated carbon filaments with the largest specific surface in Table 2.

The present invention is directed to activated carbon containing mesopores. Commercially available carbon fibers have essentially no pores. Carbon fibers which are catalytically grown from carbonaceous gases have mesopores, although the specific surface area is not high. The porous nature of catalytically grown carbon filaments is attributable to the fact that the filaments are made from carbonaceous gases.

The process of the present invention can be used for all carbon materials including, but not limited to, filaments and"

particles. Activation of the carbon material is carried out by a series of steps according to the present invention. Step 1 involves drying of the starting material. The material is heated to a temperature sufficient to remove water on the surface of the material. Generally, a temperature of about 100° C. to about 220° C. for about 30 minutes to about 120 minutes is sufficient to achieve drying. In a preferred embodiment, the material is heated to a temperature of about 110° C. for about 60 minutes.

Step 2 involves surface oxidation of the dried carbon material. This step is essential to attain a high specific surface area material in subsequent steps. While any combination of ozone or oxygen with air or nitrogen can be used, in a preferred embodiment, the oxidizing agent is a mixture of ozone and air. It is desirable to use 0.3 vol % of ozone in air. The exposure time to ozone can be anywhere from about 2 to about 30 minutes, although, in a preferred embodiment, the exposure time is about 3 minutes. It is desirable to carry out this step at a temperature of about 140° C. to about 270° C., although in a preferred embodiment, the temperature is about 150° C. The surface oxidation raises the oxygen concentration of the carbon material thereby enhancing their subsequent activation as will be described hereinafter. It is desirable to raise the surface oxygen concentration to at least 2 atom percent. Surface oxidation also slightly increases the mesopore size and slightly decreases the specific surface area. While not intending to be bound by any particular theory, it is believed that since $O_3$ reacts with graphite, the increase in mesopore size accompanied by a slight decrease in specific surface area upon $O_3$ exposure is due to the removal of some microcracks.

Next, the surface oxidized carbon material is heated in nitrogen or an inert gas. The heating temperature is increased at a rate of about 1 to 3 degrees per minute until a temperature of about 450° C. to about 600° C. is reached. The heating step removes hydrocarbons from the surface of the material, releases hydrogen and other volatiles and stabilizes the structure of the material. In a preferred embodiment, the material is heated to about 500° C. with the temperature increased at a rate of about 2° C./minute.

In the next step, the carbon material is heated in nitrogen or an inert gas to a temperature of about 800° C. to about 1100° C. at a rate of about 3° C./minute to about 20° C./minute. A more preferred temperature range is about 970° C. to about 1000° C. A preferred rate of heating is 3° C./minute. The nitrogen heating step further removes hydrogen and other volatiles from the carbon material and stabilizes the material even further both in microscopic structure and in form.

The final activation step involves the formation of pores by heating of the stabilized material with a gas that reacts directly or indirectly with the carbon of carbon material. Suitable agents include, but are not limited to, $CO_2$, $O_2$, steam and KOH. Activation is carried out by heating the stabilized material at a temperature of about 600° C. to about 1100° C. for about 10 minutes to about 120 minutes. It is desirable to heat the material in the presence of nitrogen or an inert gas, which acts as a carrier.

While not intending to be bound by any particular theory, it is believed that when the activating agent is $CO_2$ this step primarily involves the reaction $C+CO_2 \rightarrow 2CO$. In a preferred embodiment of the present invention, a mixture of $CO_2$ and $N_2$ in a volume ratio of 1:1 is used to activate the carbon material. It is preferable to carry out this step at a temperature of about 900° C. to about 1100° C. for a period of about 20 minutes to about 150 minutes. In a more preferred embodiment of the present invention, activation occurs at a temperature of about 970° C. This activation step greatly increases the specific surface area and decreases the mesopore size of the carbon material such that the specific surface area increases sharply with activation time up to 80 minutes at a fixed activation temperature around the preferred temperature of 970° C. However, the pore size appears to be independent of the activation time. The specific surface area decreases upon increasing activation time from about 80 minutes to about 100 minutes. While not intending to be bound by any theory, it is believed that the inverse relationship between the specific surface area and activation time greater than 80 minutes is probably due to the partial destruction of the pore structure at the high degree of activation corresponding to the activation time of about 100 minutes. For this step, $CO_2$ can also be mixed with steam.

When the activating agent is steam, activation is achieved by heating the stabilized material in steam. In a preferred embodiment, the stabilized material is heated to about 800° C. to about 950° C. for a period of about 10 minutes to about 70 minutes. While not intending to be bound by any particular theory, it is believed that the primary reaction involved is $C+2H_2O \rightarrow CO_2+2H_2$.

In another preferred embodiment, the activating agent is oxygen and the stabilized material is heated to a temperature of at least 1000° C. This step may be carried out in the presence of steam. While not intending to be bound by any particular theory, it is believed that the primary reactions are $C+O_2 \rightarrow CO_2$ and $2C+O_2 \rightarrow 2CO$.

In yet another embodiment, the activating agent is KOH and the stabilized material is heated to a temperature of about 800° C. to about 1000° C. for about 30 minutes to about 120 minutes. While not intending to be bound by any particular theory it is believed that the primary reaction involved is $4KOH+C \rightarrow K_2CO_3+K_2O+2H_2$.

Typical carbon material resulting from the process of the present invention has a much higher surface area than unprocessed carbon material. The surface area of carbon material was determined by using the standard Brunauer-Emmett-Teller (BET) model of physical adsorption using nitrogen. The nitrogen adsorption measurement involves measuring the amount of nitrogen needed to form a monolayer on the surface of the sample under study. From this information, the surface area of the sample is obtained. Beginning with unprocessed carbon filaments having a surface area of 54 $m^2/g$, the process of the present invention resulted in increased surface areas of up to approximately 1300 $m^2/g$.

The increase in the surface area of activated carbon material produced according to the present invention was confirmed by iodine adsorption and methylene blue adsorption studies. Iodine adsorption is defined as the milligrams of iodine adsorbed by 1 gram of active carbon from an aqueous solution when the iodine concentration of the residual filtrate is 0.02N. The iodine adsorption of active carbon material is calculated by using the formula:

$$a=12.693N_1-279.246N_2V$$

where, a is the quantity of iodine in milligrams adsorbed by the active carbon material, $N_1$ is the normality of the iodine solution, $N_2$ is the normality of the sodium thiosulfate solution, V is the volume of thiosulfate solution in $cm^3$.

Methylene blue adsorption gives an indication of the adsorptive capacity of a carbon for molecules having dimensions similar to those of methylene blue. A molecule of methylene blue has a linear dimension of 1.5 nm. Hence methylene blue adsorption indicates the presence of pores of diameter greater than 1.5 nm. The methylene blue adsorption value is determined by titrating 15 mg of active carbon material with methylene blue until the methylene blue solution ceases to decolorize after 5 minutes. Both iodine adsorption and methylene blue adsorption for as-received carbon filaments was negligible.

The pore size and pore volume of the activated carbon material resulting from the method of the present invention were determined according to the standard model of Barrett, Joyner and Halenda (BJH) from adsorption isotherm data for nitrogen measured at a temperature of 77 K. A plot of pore volume (cm$^3$/g-Å) versus pore size (Å) was used to determine the main pore size, which, for the purpose of this invention is defined as the pore size with the greatest pore volume. The process of the present invention results in carbon material with a main pore size of at least 35 Å. In a preferred embodiment, the main pore size is at least 50 Å.

The yield of the activated carbon material according to the present invention was determined by thermogravimetric analysis using a Perkin-Elmer™ TGA7 instrument. The yield of the process is expressed as the material recovered after activation as a percentage of the material after the oxidation step. The yield for the present invention was above 30%. The yield is unaffected by the first four steps, but decreases with the time of activation in the final step of the present invention.

The following examples will help to illustrate the present invention.

EXAMPLE 1

Carbon filaments of diameter ~0.1 µm and with low crystallinity (as indicated by an extremely weak 002 X-ray diffraction peak) were provided by Applied Sciences, Inc. (Cedarville, OH). Typically these fibers are grown from a cabonaceous gas such as methane using a metal catalyst such as iron. They were bent in the as-received condition, resembling cotton wool, with lengths of at least 100 µm. Activation of the filaments was achieved by (1) drying at 110° C. in air for 1 hour, (2) exposure to $O_3$ (0.3 vol % in air) for 3 min at 150° C., (3) heating in $N_2$ with temperature increased 2° C./min to a final temperature of about 500° C., (4) heating in $N_2$ with the temperature increased at 3° C./minute to a final temperature of either 970° C. or 1000° C., and (5) heating in a mixture of $CO_2$ and $N_2$ in a 1:1 volume ratio at either 970° C. or 1000° C. for either 20 minutes, 40 minutes, 60 minutes, 80 minutes or 100 minutes. Step 2 raised the surface oxygen concentration from 1.0 to 2.2 atom percent.

EXAMPLE 2

Binding energy analysis by Electron Spectroscopy for Chemical Analysis (ESCA) was carried out to determine the effect of activation on the fraction of surface carbon atoms bonded to hydrogen and oxygen for filaments obtained in Example 1. Table 1 shows the fraction of surface carbon atoms bonded to hydrogen as C—H (eg., $(CH_2)_n$), bonded to oxygen as C—O (eg., C—OH, C—O—C) and bonded to oxygen as C=O (eg., O=C—OH, O=C—O—R). Since iron catalyst is used in the manufacture of the as-received filaments, detection of the catalyst is indicative of exposure of the catalyst at the surface of the filaments. If no catalyst is detected, then it is presumed that the catalyst particle is not exposed at the surface but rather, covered in the filament. For the filaments of the present invention, no catalyst was detected by ESCA, indicating that the residual interior catalyst was not exposed. Ozone exposure increased the C—O fraction, but did not affect the C=O fraction. Activation increased both C—O and C=O fractions.

TABLE 1

|  | C—H | C—O | C=O |
|---|---|---|---|
| As-received | 94.0% | 6.0% | 0 |
| After $O_3$ exposure | 89.0% | 11.0% | 0 |
| After activation | 82.1% | 13.4% | 4.5% |

EXAMPLE 3

To determine the effect of activation treatment on surface characteristics of activated carbon filaments, nitrogen adsorption measurements of the pressure of the gas during adsorption were carried out using a Micromeritics™ ASAP 2000 instrument. Nitrogen adsorption is a measure of the surface area of the material. In conjunction with either BET or BJH analysis, the nitrogen adsorption indicates the pore size distribution. BET analysis is used for pores less than about 800 Å and BJH analysis is used for pores less than about 3000 Å. Table 2 shows the specific surface area (BET), pore size and pore volume (BJH for pore size >20 Å and t-plot for pore size ≦20 Å) of the filaments before and after the surface oxidation steps and before and after the final activation steps. Even in the as-received condition, the filaments had mesopores, though the specific surface area was low. FIG. 1 shows the pore size distribution of activated carbon filaments with the highest specific surface area in Table 2. The pore size distribution is expressed as a plot of pore volume (cm$^3$/g-Å) versus pore size (Å). The area under curve 1 gives the pore volume in units of cm$^3$/g. The pore size with the greatest pore volume in units of cm$^3$/g-Å is the main pore size. The pore size distribution was bimodal, with mesopores of main pore size 55 Å dominating micropores of main pore size 16 Å. A bimodal pore size distribution was observed for all of the activated filaments of Table 2, but not for the as-received or ozone treated filaments.

TABLE 2

| Activation condition | Specific surface area (BET, m$^2$/g) | Pore size (Å) | Pore volume (cm$^3$/g) Total | Lower size range[a] | Upper size range[b] | Yield (%) |
|---|---|---|---|---|---|---|
| As received | 54.0 ± 0.3 | 81.7* | 0.110 | 0.061 | 0.049 | / |
| After $O_3$ exposure | 40.7 ± 0.3 | 99.1+ | 0.095 | 0.041 | 0.055 | 100 |
| 970° C., 20 min | 218 ± 2 | 55.2+ | 0.257 | 0.091 | 0.166 | 76.4 |
| 1000° C., 20 min | 532.5 ± 8.5 | 52.6+ | 0.575 | 0.112 | 0.463 | / |
| 970° C., 40 min | 913 ± 16 | 55.0+ | 1.077 | 0.204 | 0.873 | 56.2 |
| 970° C., 60 min | 1121 ± 8 | 55.3+ | 1.323 | 0.249 | 1.074 | 48.2 |
| 970° C., 80 min | 1306 ± 16 | 55.3+ | 1.548 | 0.267 | 1.280 | 36.2 |
| 970° C., 100 min | 1214 ± 11 | 54.1+ | 1.493 | 0.257 | 1.236 | 30.1 |

*Mean pore size from 10 to 1000 Å.
+Main pore size above 20 Å.
[a]Size below ~30 Å. See FIG. 1.
[b]Size above ~30 Å. See FIG. 1.

Figure 2:
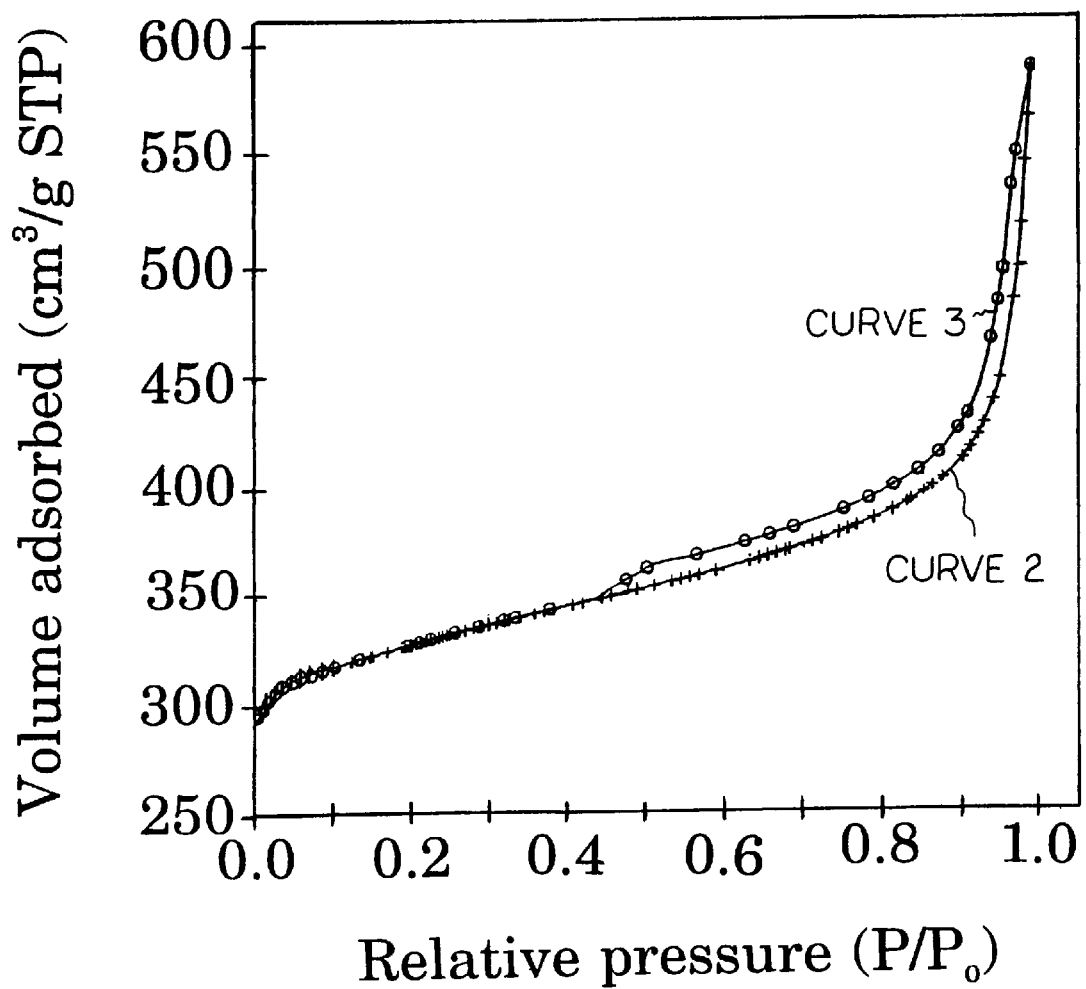
FIG. 2 shows the nitrogen (77 K) adsorption (+) and desorption (o) isotherms for activated carbon filaments as a plot of the volume of nitrogen gas adsorbed on the surface of the carbon filaments per gram of the filament versus the nitrogen pressure P relative to the nitrogen vapor pressure $P_o$ at 77 K.

FIG. 2 shows the nitrogen adsorption/desorption isotherms for the sample of FIG. 1. The nitrogen adsorption is shown in curve 2 while the nitrogen desorption is shown in curve 3. These isotherms are consistent with the bimodal pore size distribution illustrated in FIG. 1. The iodine adsorption of the sample of FIG. 1 with a main pore size of 55 Å was 1412.2 mg/g and the methylene blue decoloring was 256.4 ml/g. The corresponding values for the as-received material are difficult to measure since they are extremely low.

EXAMPLE 4

To further confirm the increase in specific surface area of carbon filaments produced by the process of the present invention, X-ray diffraction studies using CuKα radiation were carried out to measure the d-spacing for the graphite 002 plane. The d-spacing for the graphite 002 plane is the interplanar spacing between adjacent carbon layers in the crystal structure of graphite. It is well-known that activation of carbon increases the d-spacing. The d-spacing for carbon filaments of the present invention (970° C. in step 4, and 970° C. for 80 minutes in step 5) was 3.476 Å compared to a d-spacing of 3.367 Å for the as-received filaments. The observed increase in d-spacing indicates that activation was achieved by the process of the present invention.

EXAMPLE 5

Figure 3:
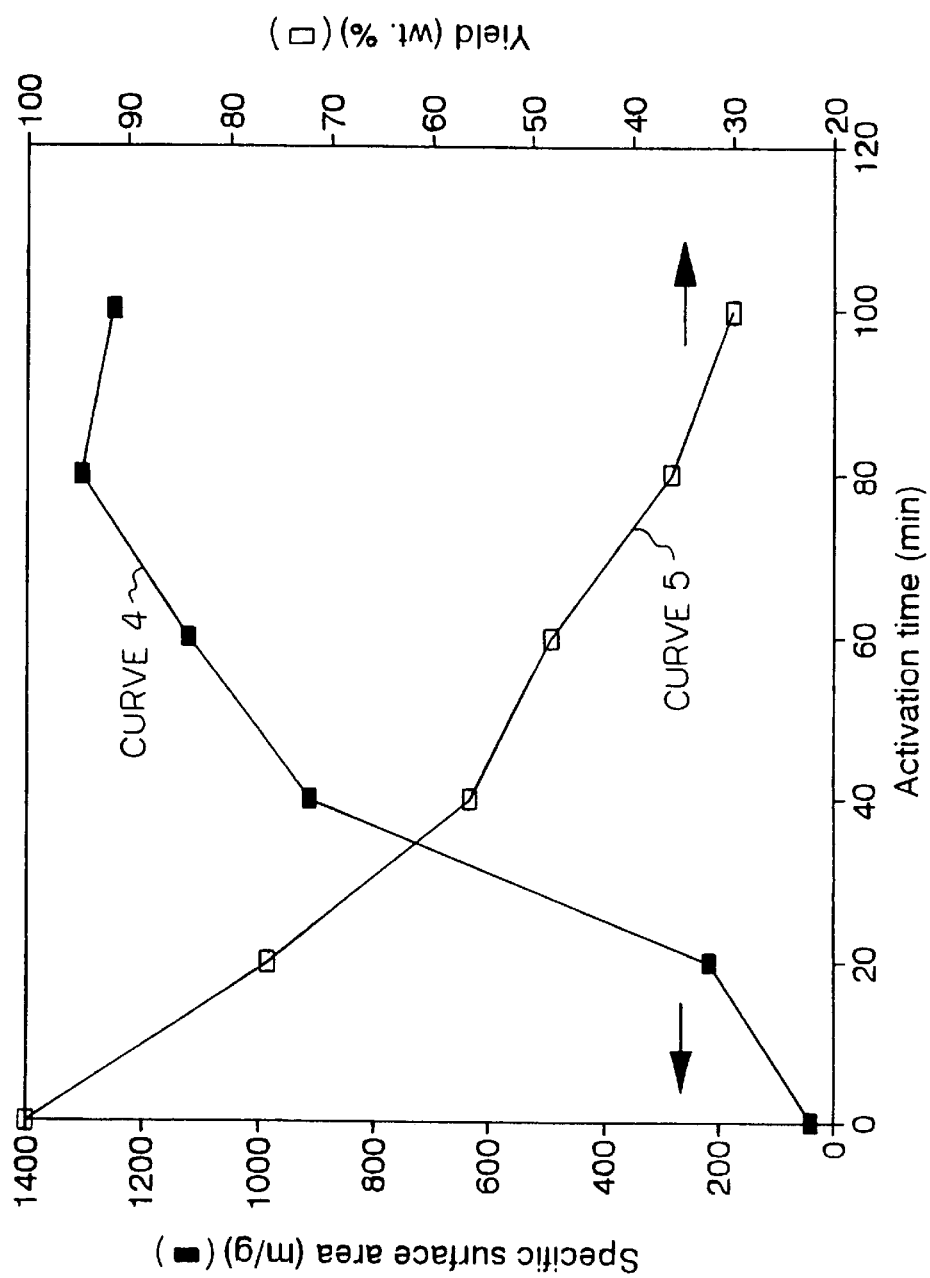
FIG. 3 shows the variation of the specific surface area and yield of the process with activation time for a fixed activation temperature of 970° C.

To determine the yield of activated carbon filaments produced by the process of the present invention, the burn-off or fractional weight loss due to activation was measured by thermogravimetric analysis (TGA) using a Perkin-Elmer™ (Norwalk, CT) TGA7 instrument. The conditions for steps (3), (4), and (5) were the same as described in Example 1. The temperature in steps (4) and (5) was 970° C. The burn-off relative to the filament weight after step (2) was 1.01%, 2.71%, 4.96% and 12.3% at 500° C., 600° C., 700° C. and 970° C., respectively, in steps (3) and (4) and 23.0%, 43.8%, 51.8%, 63.8% and 69.9% at 20 minutes, 40 minutes, 60 minutes, 80 minutes and 100 minutes, respectively, in step (5). The sample with the largest specific surface area in Table 2 (970° C., 80 min) corresponds to a burn-off of 63.8% resulting in a yield of 36.2%. FIG. 3 shows the increase of the specific surface area (curve 4) and decrease of the yield (curve 5) as the activation time was increased at a fixed activation temperature of 970° C.

EXAMPLE 6

Figure 4:
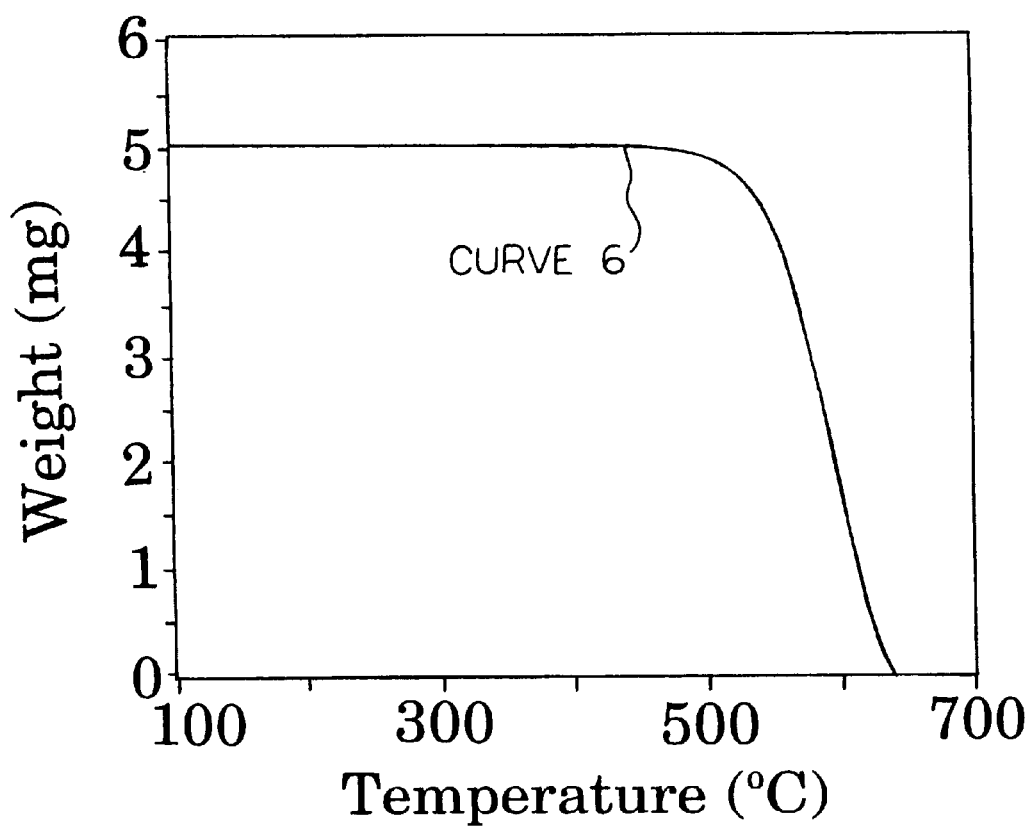
FIG. 4 is a plot of the weight of the filaments (mg) obtained by thermogravimetric analysis as a function of the temperature for activated carbon filaments (activated at 970° C. for 80 minutes), during heating at a rate of 5° C./minute.

Thermal stability of activated carbon filaments was determined by thermogravimetric analysis using a Perkin-Elmer™ Corp. TGA7 instrument. The temperature in step (4) was 970° C. and the activation was carried out at 970° C. for 80 minutes in step (5). The filaments were then allowed to cool and the thermal stability determined by increasing the temperature at a rate of 5° C./min. In FIG. 4, the weight of carbon filaments is plotted as a function of temperature (curve 6). The plot shows that activated carbon filaments were thermally stable up to about 450° C. Above that temperature, weight loss occurred probably due to oxidation of the carbon.

It is appreciated that various modifications to the inventive concepts described herein may be apparent to those skilled in the art without departing from the spirit and scope of the present invention defined by the hereinafter appended claims.

What is claimed is:

1. An activated carbon selected from the group consisting of filaments and particles, having a specific surface area of at least 200 square meters per gram and a main pore size of at least 50 Å.

2. The activated carbon of claim 1, wherein the specific surface area is at least 1000 square meters per gram.

3. A method of making the activated carbon of claim 1 comprising the steps of:
   (a) heating carbon to provide a dried carbon;
   (b) oxidizing the dried carbon by heating in an oxidizing gas;
   (c) stabilizing the oxidized carbon by heating in a stabilizing gas selected from the group consisting of nitrogen and inert gases; and
   (d) activating the stabilized carbon by heating at a temperature of about 600° C. to about 1100° C. in an activating gas that reacts with the carbon selected from the group consisting of $CO_2$, $O_2$, steam and KOH for between about 10 minutes to about 120 minutes.

4. The method of claim 3, wherein the carbon in (a) is filamentous.

5. The method of claim 3, wherein drying is achieved by heating at a temperature of at least 100° C. for at least 30 minutes.

6. The method of claim 5, wherein drying is achieved by heating at a temperature of between about 100° C. to about 220° C. for between about 30 minutes to about 120 minutes.

7. The method of claim 6, wherein drying is achieved by heating at about 110° C. for about 60 minutes.

8. The method of claim 3, wherein oxidation causes the surface oxygen concentration to reach at least 2 atom percent.

9. The method of claim 3, wherein the oxidizing gas comprises ozone.

10. The method of claim 9, wherein the oxidizing gas further comprises air.

11. The method of claim 10, wherein the oxidizing gas is 0.3 volume ozone % in air.

12. The method of claim 3, wherein oxidation is achieved by heating at a temperature of at least 140° C. for at least 2 minutes.

13. The method of claim 12, wherein oxidation is achieved by heating at a temperature of between about 140° C. to about 270° C. for between about 2 minutes to about 30 minutes.

14. The method of claim 13, wherein oxidation is achieved by heating at about 150° C. for about 3 minutes.

15. The method of claim 3, wherein stabilization is achieved by first heating to a temperature of between about 450° C. to about 600° C. at a rate of between about 1° C./minute to about 3° C./minute and then heating to a temperature of between about 800° C. to about 1100° C. at a rate of between about 3° C./minute to about 20° C./minute.

16. The method of claim 15, wherein stabilization is achieved by first heating to a temperature of about 500° C. at a rate of about 2° C./min and then heating to a temperature of between about 970° C. to about 1000° C. at a rate of about 3° C./minute.

17. The method of claim 3, wherein the activating gas comprises carbon dioxide.

18. The method of claim 17, wherein the activating gas further comprises a carrier gas selected from the group consisting of nitrogen and inert gases.

19. The method of claim 18, wherein the activating gas is a mixture of carbon dioxide and nitrogen mixed in approximately equal volumes.

20. The method of claim 19, wherein activation is achieved by heating at a temperature of between about 900° C. to about 1100° C. for between about 20 minutes to about 150 minutes.

21. The method of claim 20, wherein activation is achieved by heating at a temperature of about 970° C. for 80 minutes.

22. The method of claim 3, wherein activating gas comprises steam.

23. The method of claim 22, wherein the activating gas further comprises a carrier gas selected from the group consisting of nitrogen and inert gases.

24. The method of claim 23, wherein the activation is achieved by heating at a temperature of between about 800° C. to about 950° C. for about 10 minutes to about 70 minutes.

25. The method of claim 3, wherein the activating gas comprises oxygen.

26. The method of claim 25, wherein the activating gas further comprises a carrier gas selected from the group consisting of nitrogen and inert gases.

27. The method of claim 26, wherein activation is achieved by heating to a temperature of at least 1000° C.

28. The method of claim 3, wherein the activating gas comprises potassium hydroxide.

29. The method of claim 28, wherein the activating gas further comprises a carrier gas selected from the group consisting of nitrogen and inert gases.

30. The method of claim 29, wherein the activation is achieved by heating at a temperature of between about 800° C. to about 1000° C. for about 30 minutes to about 120 minutes.

* * * * *